(12) United States Patent
Sather et al.

(10) Patent No.: US 10,080,920 B2
(45) Date of Patent: Sep. 25, 2018

(54) ROTATIONAL FITNESS APPARATUS

(71) Applicants: Michael C. Sather, Fargo, ND (US); Chad O. Lorenson, Fargo, ND (US)

(72) Inventors: Michael C. Sather, Fargo, ND (US); Chad O. Lorenson, Fargo, ND (US)

( * ) Notice: Subject to any disclaimer, the term of this patent is extended or adjusted under 35 U.S.C. 154(b) by 11 days.

(21) Appl. No.: 15/211,709

(22) Filed: Jul. 15, 2016

(65) Prior Publication Data
US 2017/0014666 A1 Jan. 19, 2017

Related U.S. Application Data

(60) Provisional application No. 62/193,270, filed on Jul. 16, 2015.

(51) Int. Cl.
| | |
|---|---|
| *A63B 22/00* | (2006.01) |
| *A63B 23/02* | (2006.01) |
| *A63B 21/068* | (2006.01) |
| *A63B 23/035* | (2006.01) |
| *A63B 23/04* | (2006.01) |
| *A63B 23/12* | (2006.01) |
| *A63B 21/16* | (2006.01) |
| *A63B 22/20* | (2006.01) |
| *A63B 23/00* | (2006.01) |

(Continued)

(52) U.S. Cl.
CPC ........ *A63B 23/0205* (2013.01); *A63B 21/068* (2013.01); *A63B 21/4045* (2015.10); *A63B 21/4049* (2015.10); *A63B 23/03525* (2013.01); *A63B 23/03541* (2013.01); *A63B 23/0476* (2013.01); *A63B 23/0482* (2013.01); *A63B 23/12* (2013.01); *A63B 21/16* (2013.01); *A63B 21/4015* (2015.10); *A63B 22/205* (2013.01); *A63B 2022/206* (2013.01); *A63B 2023/003* (2013.01); *A63B 2208/028* (2013.01); *A63B 2210/50* (2013.01); *A63B 2225/09* (2013.01); *A63B 2225/093* (2013.01); *F16B 7/1472* (2013.01)

(58) Field of Classification Search
None
See application file for complete search history.

(56) References Cited

U.S. PATENT DOCUMENTS

| | | | | |
|---|---|---|---|---|
| 3,784,192 | A * | 1/1974 | Nutter .................... | A63B 22/20 |
| | | | | 482/132 |
| 4,375,203 | A * | 3/1983 | Parkes .................... | A61D 9/00 |
| | | | | 119/727 |

(Continued)

*Primary Examiner* — Stephen R Crow
(74) *Attorney, Agent, or Firm* — Dale J. Ream

(57) ABSTRACT

A fitness apparatus includes a support assembly having a framework selectively mounted to one of a ground surface, building structure, or fitness apparatus. A foot assembly is rotatably coupled to the support assembly and configured such that the foot assembly is displaced above a ground surface. The foot assembly includes a pair of retention members configured to selectively support the feet of a person in a toes-pointed downwardly position and above the ground surface. The fitness apparatus that increases core muscle group activation by making traditional exercises more challenging. It is designed to have the user place their feet in a platform which then allows for three axis of rotation. Height adjustment gives the user more resistance. The largest benefit is that the user can perform these exercises without having to stop to re-adjust their feet.

16 Claims, 18 Drawing Sheets

(51) Int. Cl.
*A63B 21/00* (2006.01)
*F16B 7/14* (2006.01)

(56) References Cited

U.S. PATENT DOCUMENTS

| | | | | | |
|---|---|---|---|---|---|
| 4,478,213 | A | * | 10/1984 | Redding | A61H 1/0214 601/26 |
| 4,777,910 | A | * | 10/1988 | Pecor | A01K 15/027 119/702 |
| 4,826,151 | A | * | 5/1989 | Nuredin | A63B 21/0004 297/423.38 |
| 5,004,229 | A | * | 4/1991 | Lind | A63B 22/20 482/132 |
| 5,176,595 | A | * | 1/1993 | Lind | A63B 22/20 482/148 |
| 6,053,853 | A | * | 4/2000 | Hinds | A63B 22/20 280/205 |
| 6,695,754 | B1 | * | 2/2004 | Gazzolo | A63B 23/12 482/141 |
| 7,407,465 | B1 | * | 8/2008 | Alzamora, Sr. | A63B 22/20 280/205 |
| 8,919,291 | B2 | * | 12/2014 | De La Celle | A61D 9/00 119/727 |
| 9,844,696 | B2 | * | 12/2017 | Anderson | A63B 21/4049 |

\* cited by examiner

ROTATIONAL FITNESS APPARATUS

REFERENCE TO RELATED APPLICATIONS

This application claims the benefit of provisional patent application U.S. Ser. No. 62/193,270 filed Jul. 16, 2015 titled 3 AXIS ROTATIONAL FUNCTIONAL FITNESS DEVICE and which is incorporated herein by reference.

BACKGROUND OF THE INVENTION

The invention relates generally to the field of exercise equipment and, more particularly, to a multi-axis rotational fitness apparatus that allows a fitness enthusiast to vary exercise resistance and increase core muscle group involvement while walking on his hands without having to adjust the position of his feet.

Several devices and methods are presently available to enable users to vary resistance while walking on their hands in linear or circular patterns. For example, while performing ordinary push-ups, a user can reposition their hands along a direction perpendicular to his body. By doing so, the user will walk on his hands while his feet pivot in place. However, this method does not vary the resistance during exercise. By placing his feet on a box or raised surface during the exercise, the user can increase the resistance; however, this repositioning upsets the continuity of the movement. By using a series of boxes with increasing heights, the user can incrementally adjust resistance; however, the repositioning of the feet multiple times is burdensome and disruptive to the exercise. The user can also use various methods of suspension training bands; however, varying the resistance with this method is difficult. The user's feet can easily become tangled together if the user starts to rotate in a circular motion. In addition, the suspension training bands do not allow you to rotate your body about the axis that runs parallel to the floor.

Therefore, it would be desirable to have a multi-axis rotational fitness apparatus that allows a fitness enthusiast to vary exercise resistance and increase core muscle group involvement while walking on his hands without having to adjust the position of his feet.

BRIEF SUMMARY OF THE INVENTION

A rotational fitness apparatus according to the present invention includes a support assembly having a framework selectively mounted to one of a ground surface, the building structure, or fitness apparatus. A foot assembly is rotatably coupled to the support assembly and configured such that the foot assembly is displaced above a ground surface. The foot assembly includes a pair of retention members configured to selectively support the feet of a person in a toes-pointed downwardly position and above the ground surface.

In one embodiment of the invention, the user's feet are secured to a platform that can move vertically to change resistance, yet also rotate to allow the user's torso to continually rotate along an axis parallel to the floor. This rotation allows the user to move into postures in which his bodyweight is balanced while supported by one hand, thus increasing activation of core muscles in the torso.

The preferred embodiment of the apparatus consists of three main components: a base assembly that provides stability, a support assembly having a vertical pole that transfers the user's weight from the platform to the base, and a swiveling and rotatable foot assembly that supports the user's feet. The swiveling and rotation maneuverability of the platform facilitates three forms of rotation. The variable height adjustment along the pole permits the user to vary resistance during operation with or without dismounting from the platform.

A variation of the preferred embodiment is to eliminate the base and pole. A user could use a vertical strap to support the foot assembly from above. A swivel would allow for ease of rotation in the axis perpendicular to the ground, as well as parallel to the ground. A user could also use fasteners that would mount the foot assembly to an unrelated supportive structure.

A general object of the present invention to provide a multiple axis rotational fitness apparatus that selectively varies resistance while walking on the user's hands in a manner that does not require foot repositioning.

A further object of this invention is to provide a fitness apparatus, as aforesaid, that enables rotation of a user's torso from floor-parallel to floor-perpendicular without foot repositioning while having the ability to vary the resistance in this direction of rotation as well.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

FIG. 1b is an exploded view of the fitness apparatus as in FIG. 1a;

DETAILED DESCRIPTION OF THE INVENTION

Figure 1A:
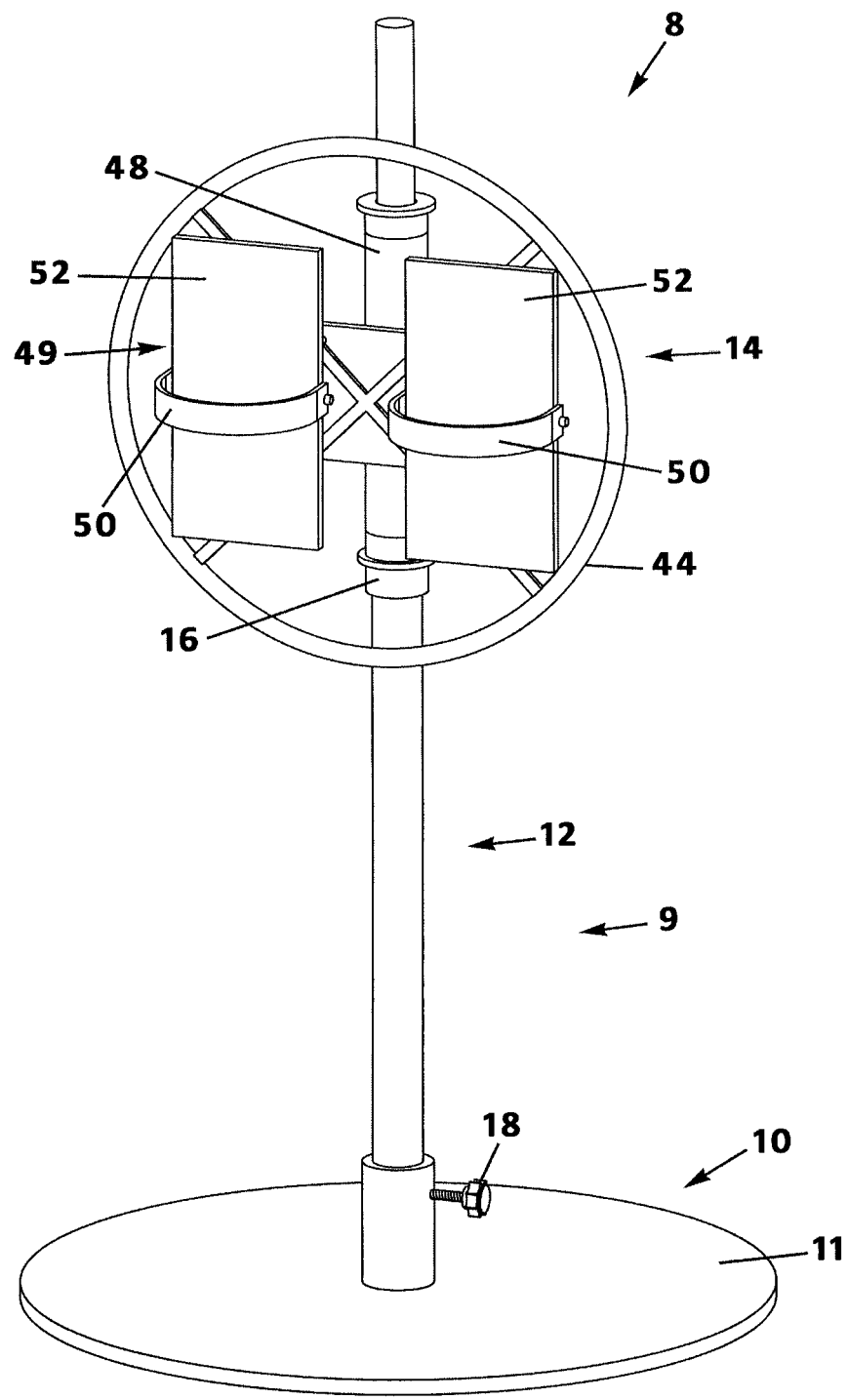
FIG. 1a is a perspective view of a multi-axis fitness apparatus according to an embodiment of the present invention.
Figure 1B:
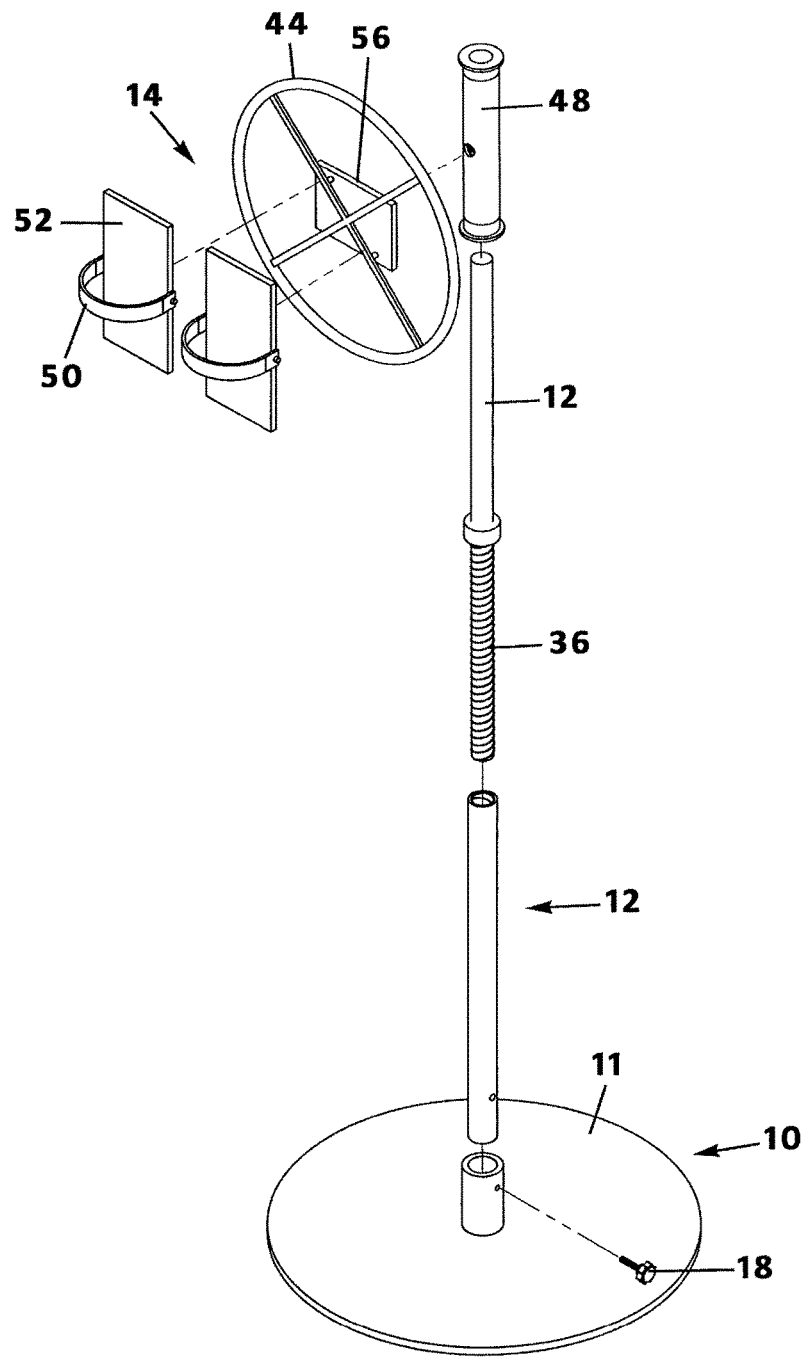
Figure 2:
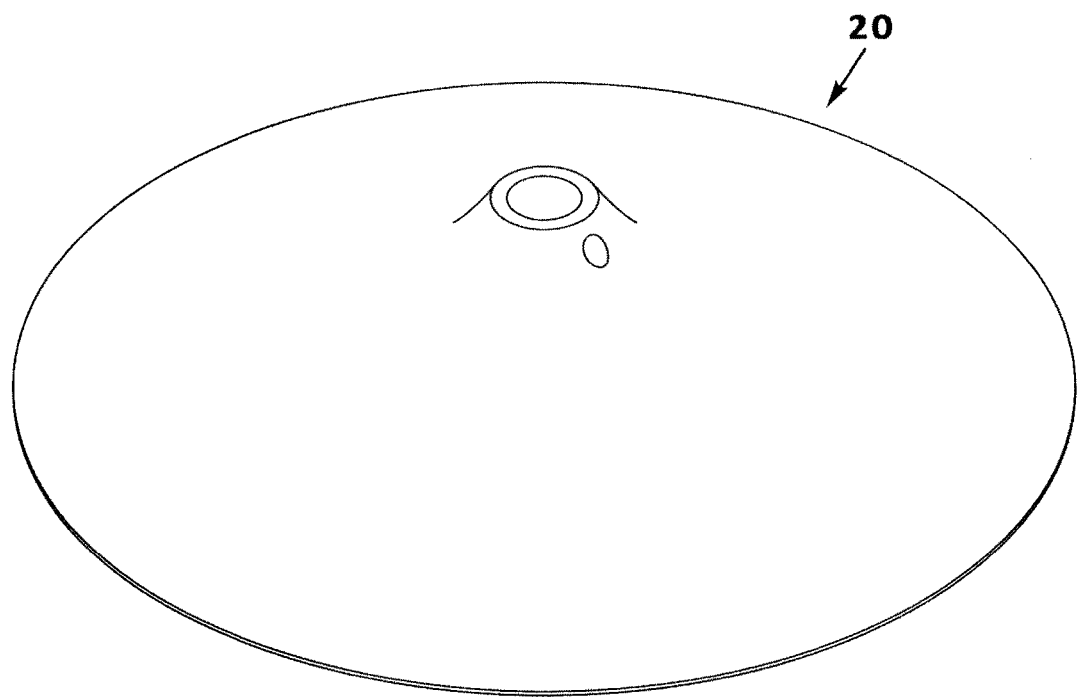
FIG. 2 is a perspective view of a base removed from the fitness apparatus of FIG. 1 illustrated as having a rounded configuration.
Figure 3:
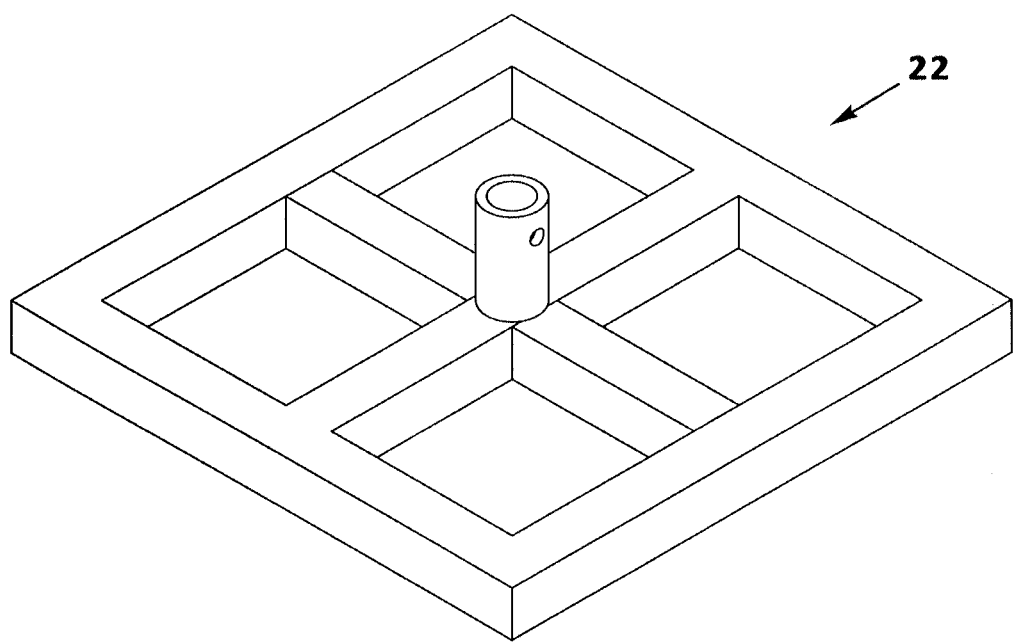
FIG. 3 is a perspective view of a base removed from the fitness apparatus of FIG. 1 illustrated as having a square configuration constructed of square tube stock.
Figure 4:
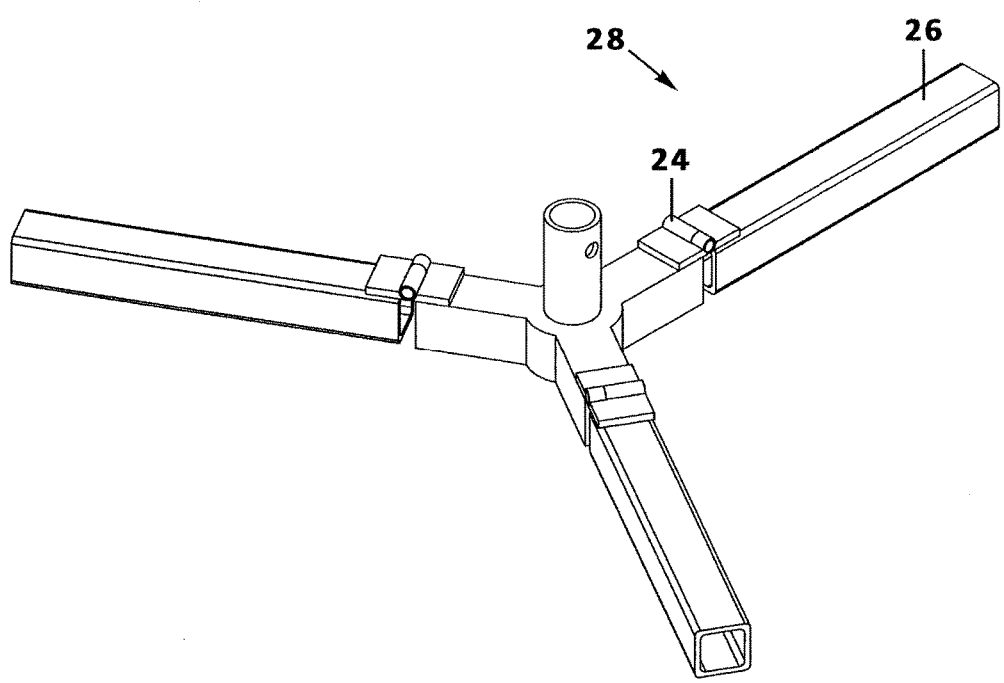
FIG. 4 is a perspective view of a base illustrated as having a tri-fold configuration.
Figure 5:
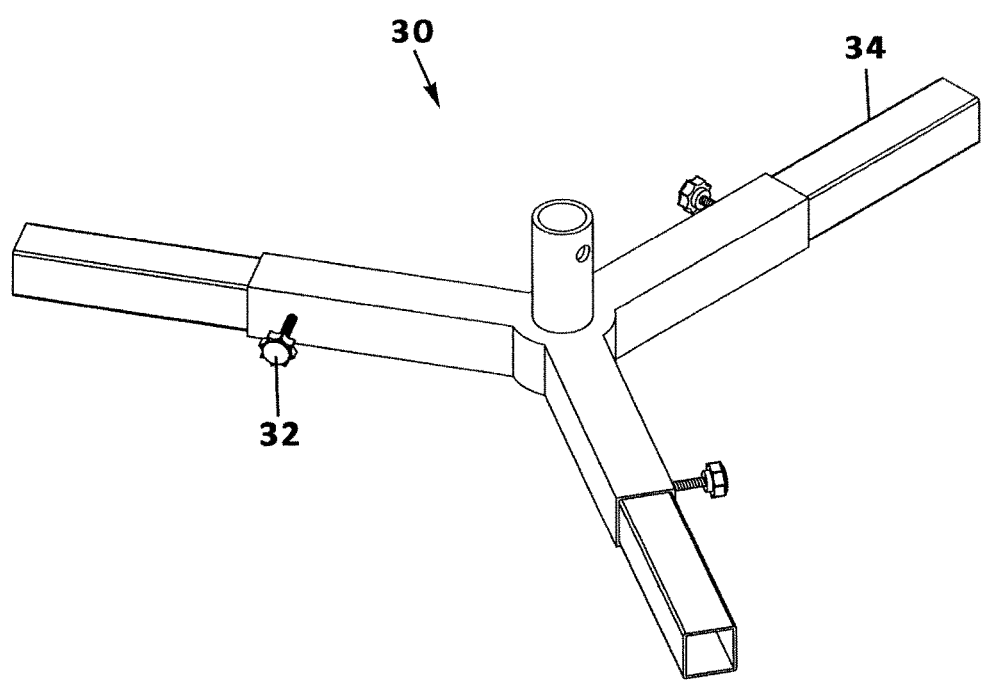
FIG. 5 is a perspective view of a base illustrated as having a tripod configuration with telescoping legs.

A multi-axis rotational fitness apparatus according to a preferred embodiment of the present invention will now be described with reference to FIGS. 1 to 17 of the accompanying drawings. The rotational fitness apparatus 8 includes a support assembly 9 that may have a base 10 that provides stability and an upstanding pole 12 that transfers a user's weight from a foot assembly 14 to the base 10. The fitness apparatus 8 includes a swiveling and rotatable foot assembly 14 that supports the user's feet.

The support assembly 9 includes a framework selectively mounted to one of a ground surface, a building structure, or a commercial fitness apparatus. For example, the support assembly 9 may include a base 10 and pole 12, an attachment structure attachable to a support assembly 9 within a home or building (FIG. 10), a hanging strap 54, or the like as will be described in more details below.

Figure 15:
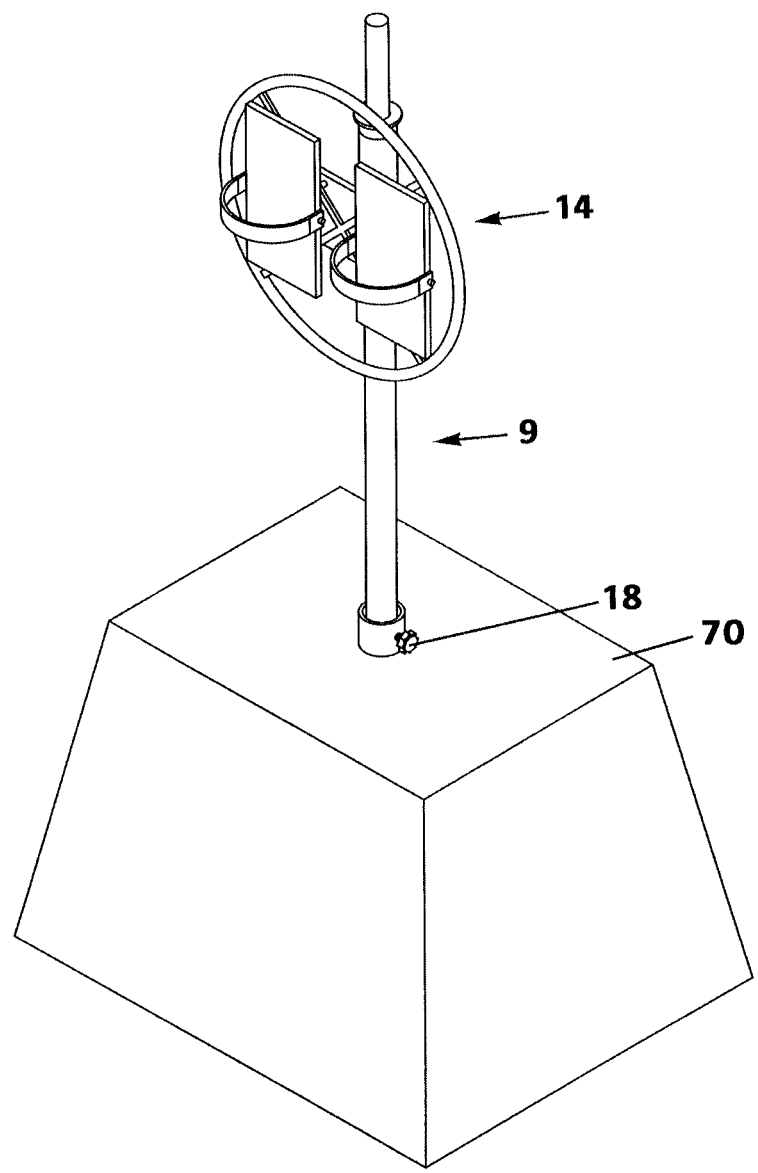
FIG. 15 is a perspective view of the fitness apparatus mounted to a plyometric stand as support.

The base 10 of the support assembly may include a circular flat panel 11, a funnel or conical base 20 (FIG. 2), a base formed of square tubing 22 (FIG. 3), a more portable base 28 having tri-fold legs 26 with hinges 24 (FIG. 4), a base 30 having length adjustable legs 34 and respective length adjustment knobs 32 (FIG. 5), a ground stake 62 (FIG. 11), and a Plyometric stand 70 (FIG. 15).

Figure 6:
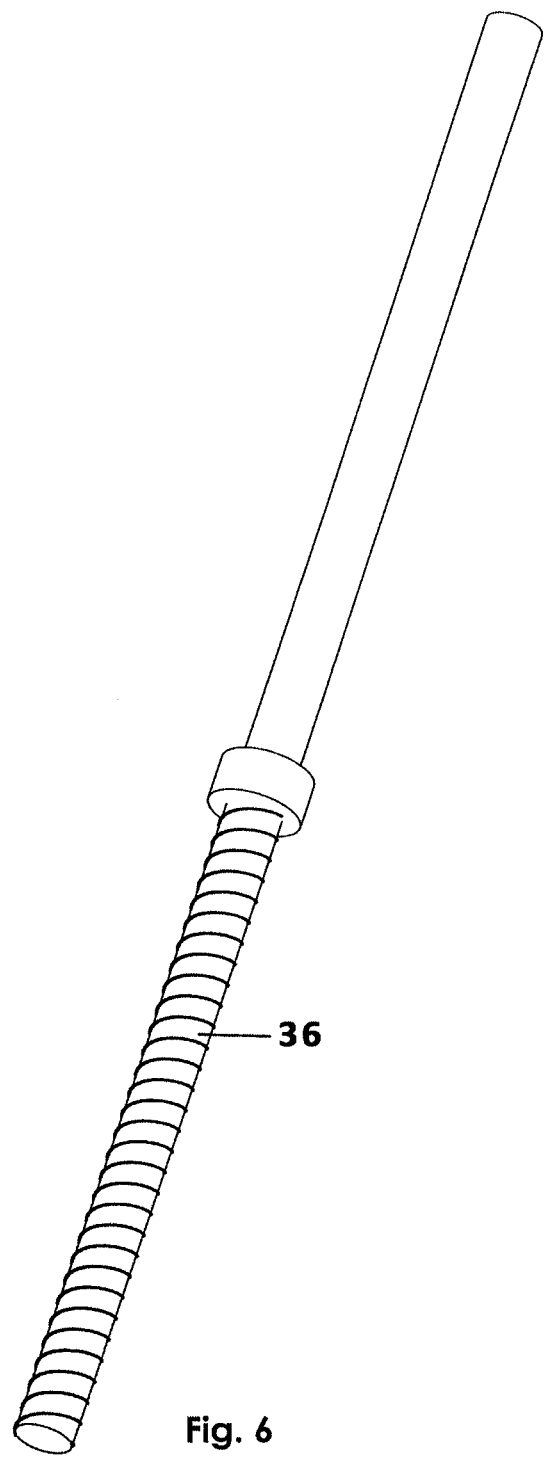
FIG. 6 is a perspective view of a pole for use with the fitness apparatus of FIG. 1 that is threaded to facilitate height adjustment.

The support assembly 9 may include components having height or length adjustment structures. In an embodiment, the support assembly 9 may include a pole 12 extending upwardly from a base that is length adjustable. More particularly, the support assembly 9 may include a pole that has a threaded construction 36 configured to be length adjustable (FIG. 6). It is understood that the threaded pole 36 may include multiple segments coupled together in a threaded manner. A length adjustable pole enables a user to vary resistance during operation with or without dismounting from the platform. A height adjustment collar 16 (FIG. 1a) may be situated on the pole to frictionally regulate movement of the multiple pole segments.

Figure 7:
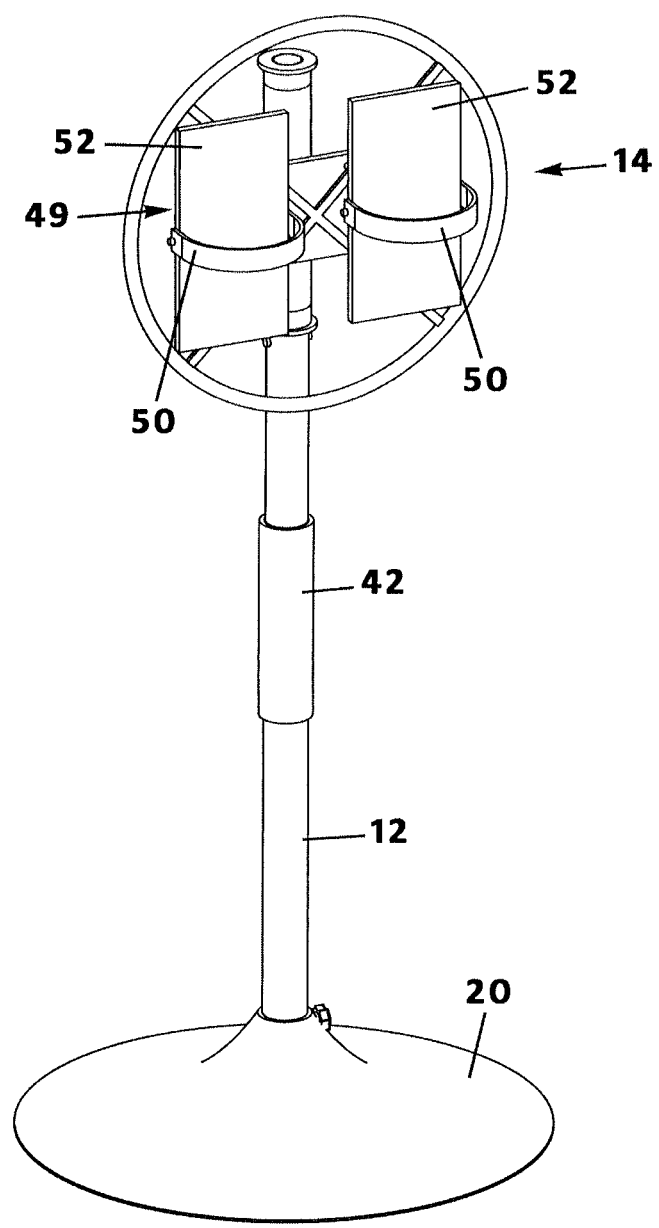
FIG. 7 is a perspective view of the fitness apparatus as in FIG. 1 illustrating the pole having a gas shock inside to facilitate height adjustment.
Figure 8:
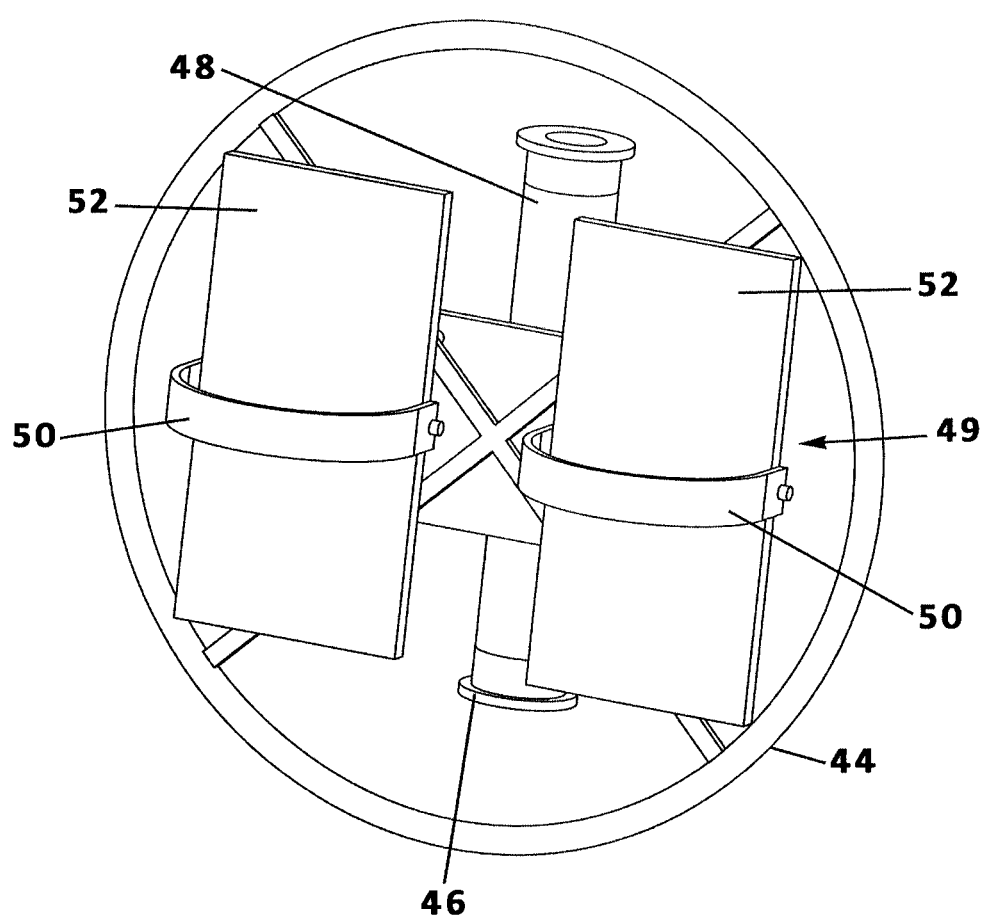
FIG. 8 is an isolated view of the foot assembly attachment.

In an embodiment, the upstanding pole 12 may have a telescopic construction, such as by including multiple segments and a pin and hole configuration, as will be appreciated by one of ordinary skill in the art. In an embodiment, the pole may include a gas shock 42 or a compression spring situated inside the pole and configured to selectively vary the length thereof (FIG. 7).

In another aspect, the foot assembly 14 includes swiveling and rotational maneuverability that facilitates three forms of rotation and resistance can be added to the bearings in these directions for varying degrees of difficulty on various exercises. The foot assembly 14 may include a pair of foot restraining members 49 configured to support the feet of a user in a toes-pointed-downwardly configuration above a ground surface as will be further described below.

The foot assembly 14 includes a rotational tube 48 having a linear configuration defining a longitudinal axis and coupled to the upstanding pole 12 of the support assembly 9. When coupled thereto, the rotational tube 48 shares a vertical axis with the pole. Being rotatable, components coupled to the rotational tube 48 are rotatably movable about the vertical axis.

The foot assembly 14 includes a framework 44 coupled to the rotational tube 48 and rotates when the rotational tube 48 is rotated as indicated above. Further, the foot retaining members 49 are coupled to the framework 44 and, as a result, are rotatable about the vertical axis defined by the pole 12 when the rotational tube 48 is rotated. The framework 44 may also include a swivel coupling 56 (such as by a bolt or rod) between the framework 44 and rotational tube 48 such that the framework 44 may swivel in a clockwise or counterclockwise motion suitable for some exercises as will be described below and with relation to FIG. 17.

In an embodiment, each retaining member 49 includes a foot pad 52 having a generally planar configuration upon which a foot of a user may be supported. Each retaining member 49 also includes a foot strap 50 constructed of a flexible material and coupled to opposed side edges of a respective foot pad 52 and extending therebetween. The foot strap 50 is configured to capture and gently secure a foot therein during use of the apparatus. The foot assembly 14 includes a framework 44 coupled to the rotational tube 48. The framework 44 may have a circular configuration although other arrangements may also work. The retaining members are coupled to the framework 44. There are bushings 46 on the top and bottom of the rotational tube 48 that allow for the foot pad 52 attachment insert into the rotational tube 48 which allow for the foot assembly 14 to rotate around the main pole 12.

Figure 9:
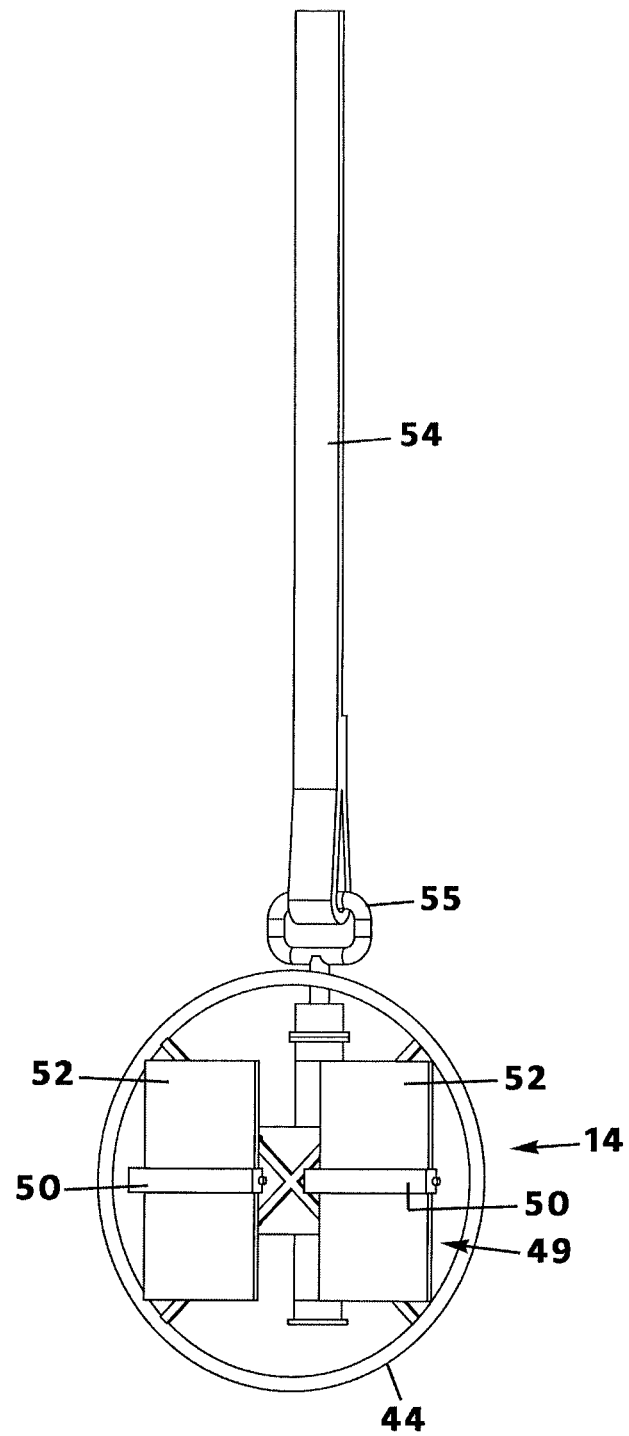
FIG. 9 is a perspective view of the foot assembly attachment in use with a vertical strap for support.

There are other alternative embodiments where the foot assembly 14 can be used without the base 10 or pole 12. In an embodiment, the foot assembly 14 may include a vertical and elongate hanging strap 54 (FIG. 9). In between the strap and the foot assembly a swivel 55 can be added to ensure the strap 54 does not get tangled up. The hanging strap 54 may be attached to an overhead structure of a building, fitness apparatus, or outdoor structure.

Figure 10:
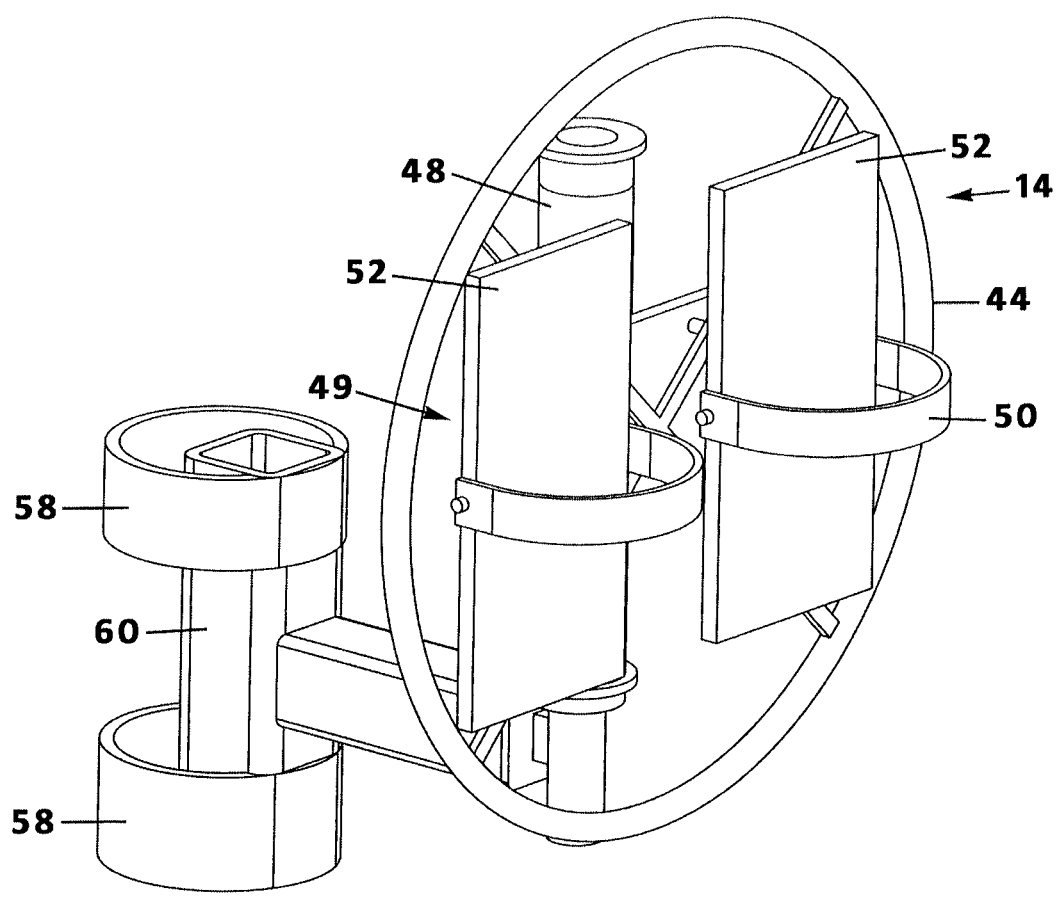
FIG. 10 is a perspective view of the foot assembly illustrated with attachment structures configured for attachment to existing support structures.
Figure 11:
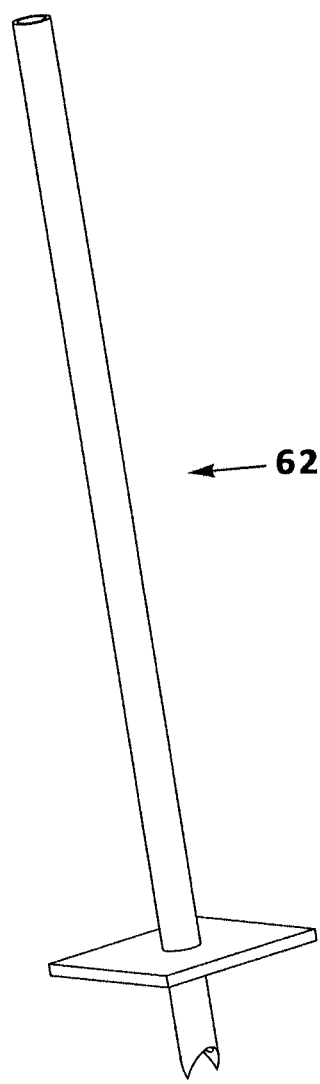
FIG. 11 is a perspective view of a pole for staking the fitness apparatus into a ground surface.

FIG. 10 shows another embodiment where the foot assembly 14 can be attached to variety of existing structures. These structures could be other gym equipment, outdoor structures, and the like. The foot assembly 14 can be selectively coupled by securing straps 58 which are attached to a weldement 60 or similar structures. It is also possible for the use of magnets to attach the weldement to another metal surface. In another embodiment, a variation of the pole described above is configured a ground stake 62 to be inserted into a ground surface for outdoor use (FIG. 11).

Figure 12:
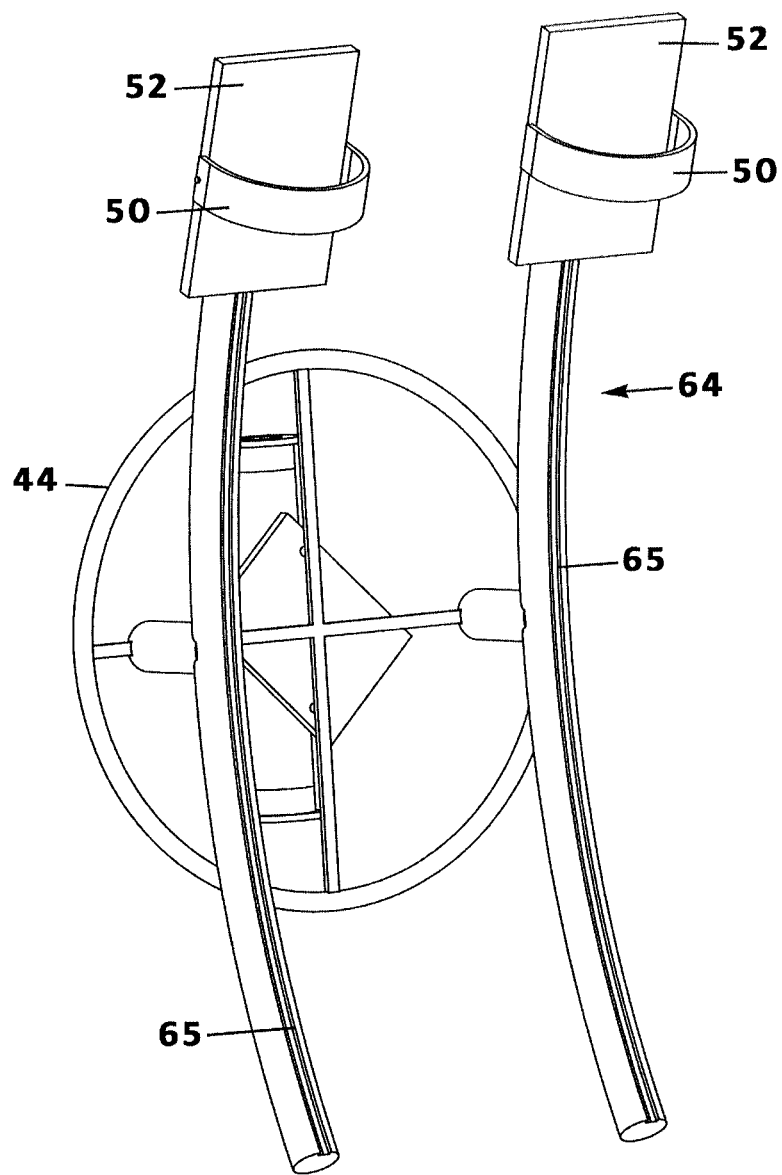
FIG. 12 is a perspective view of a leg raise attachment coupled to the foot assembly.

Finally there are multiple attachments that can be added beyond just the normal foot assembly 14. For instance, FIG. 12 illustrates a leg raise attachment 64 where the foot pads 52 can move along a track in order to do alternating leg raises. Specifically, the foot assembly 14 includes a pair of track members 65. Respective foot pads 52 are slidably coupled to respective track members 65 and movable longitudinally therealong to facilitate leg raise exercises.

Figure 13:
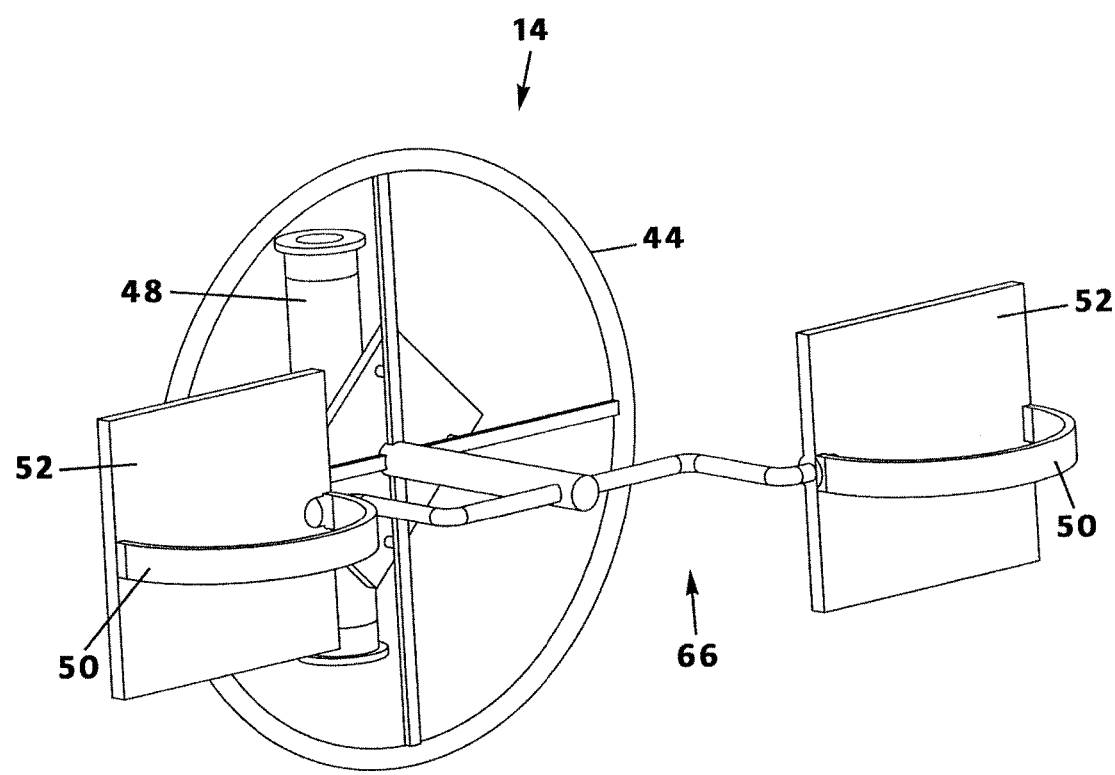
FIG. 13 is a perspective view of a pedaling accessory in use with the foot assembly.
Figure 14:
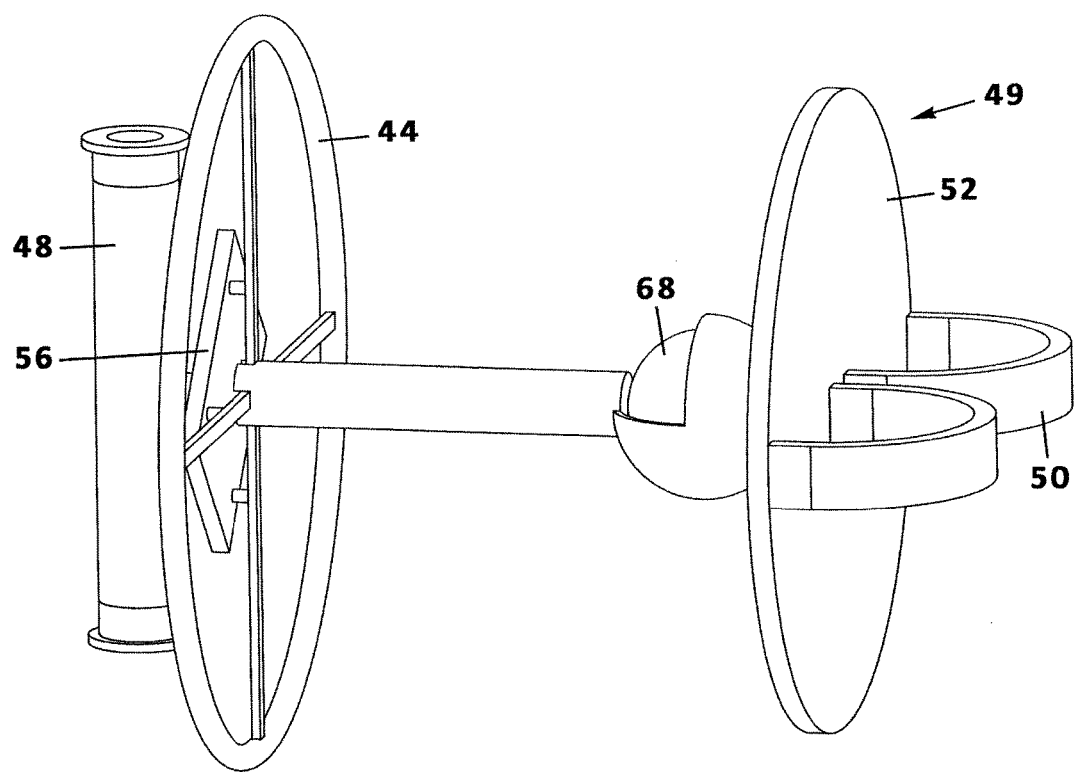
FIG. 14 is a side perspective view of an attachment for a foot receiving platform that rotates about a ball joint.

Similarly, FIG. 13 illustrates a pedaling accessory 66 for doing bike pedaling exercises. More particularly, the pedaling accessory 66 may include an axle member operatively coupled to the framework 44 and having opposed ends. Foot retaining members 49 may be coupled to each opposed end such that the axle is rotated when effort by a user's legs are applied in a pedaling motion. In an embodiment, the foot assembly 14 may be coupled to the framework 44 with a ball joint 68 such that the plane of the foot pads 52 may have an enhanced variability of angular adjustment.

Further, FIG. 15 shows an example of a support structure from an existing product, commonly referred to as a plyometric stand 70, that may be adapted to support the foot assembly 14 with the use of a pole and bearings. Additionally, the plyometric stand 70 could alternatively have a flat platform on the top of the box with a bearing that allows for rotation about the axis perpendicular to the ground without the option of rotating about the axis parallel to the floor.

Figure 16:
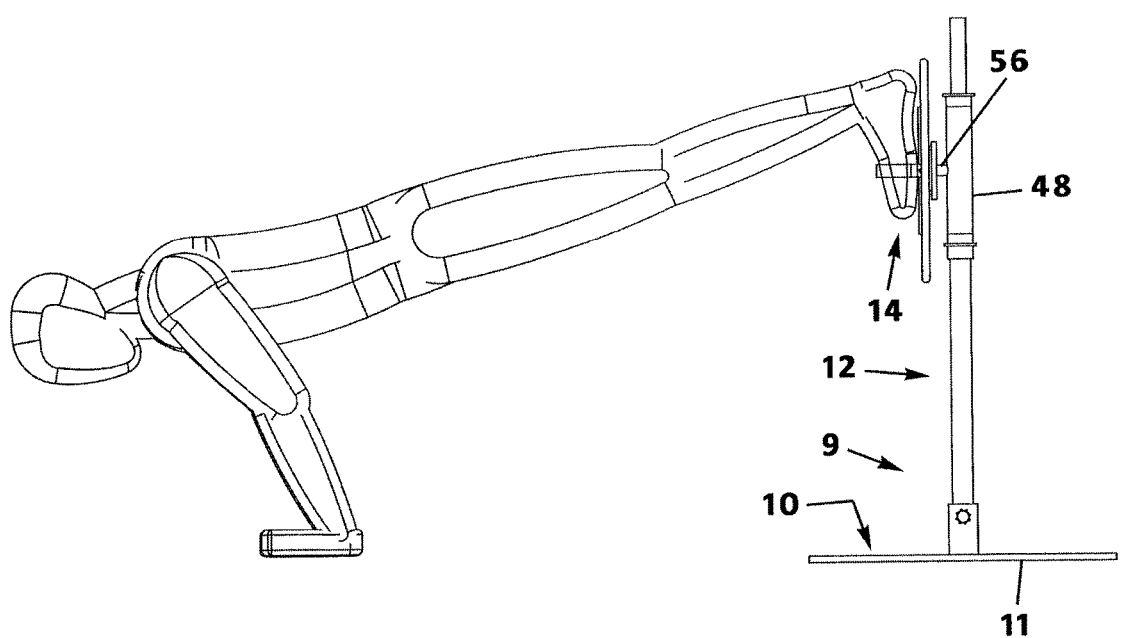
FIG. 16 is a side view illustrating a hypothetical user performing a rotation exercise about the axis perpendicular to the ground on his/her hands.
Figure 17:
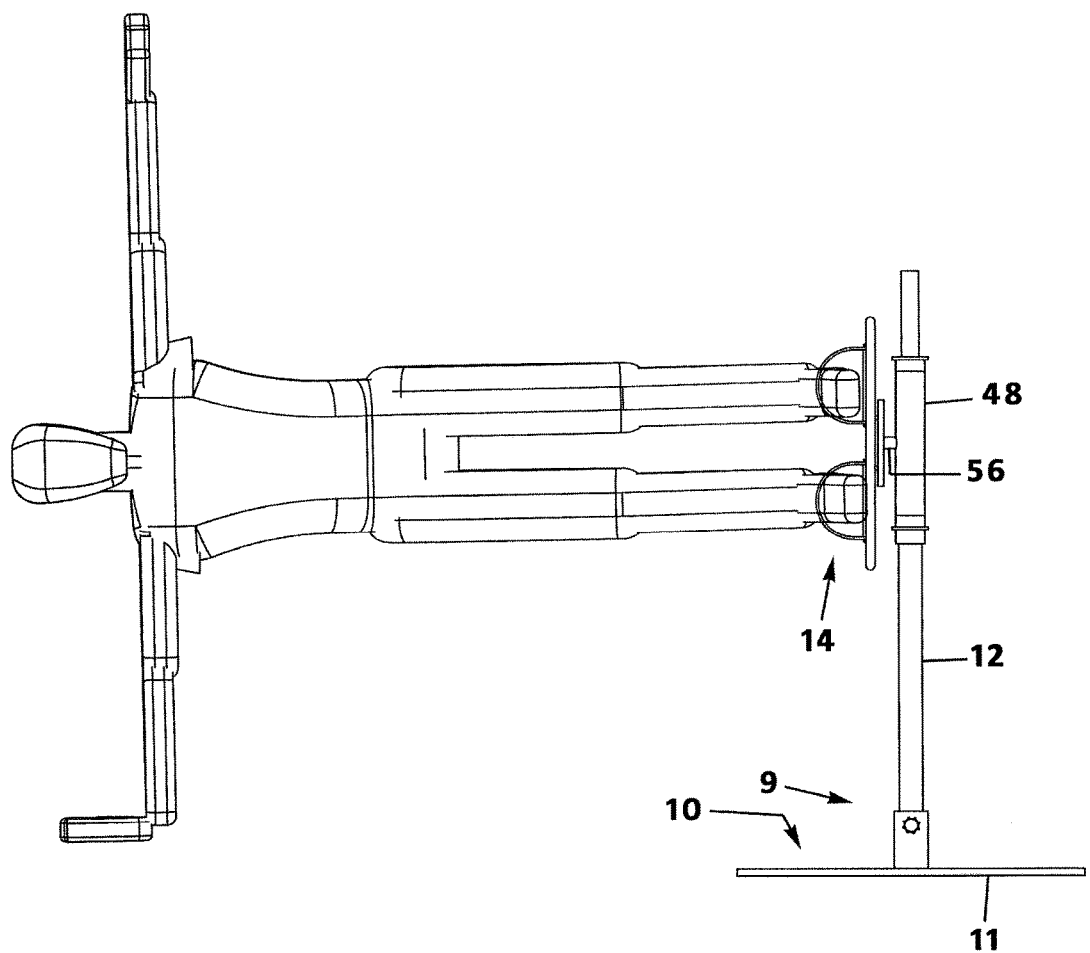
FIG. 17 is a side view illustrating a hypothetical user performing a side plank exercise, exhibiting the apparatus's ability to rotate about a axis that runs parallel to the ground.

In use, FIGS. 16 and 17 show examples of the product in use for two of the exercises that can be performed on this apparatus, it being understood that the exercises being illustrated are merely exemplary and not limiting. In FIG. 16, a user secures his feet in the restraining straps 50, respectively, with toes pointed downwardly toward the ground. Then, in a push-up position, the user can walk sideways on the ground surface while the framework 44 of the foot assembly via the rotational tube 48 is rotates about the vertical axis defined by the pole 12 or other support member. In FIG. 17, a user again secures her feet in the restraining straps 50, respectively, and rotates her body about an imaginary axis that runs parallel to the ground and perpendicular to the framework 44 of the foot assembly 14.

While certain forms of this invention have been illustrated and described, it is not limited thereto except insofar as such limitations are included in the following claims and allowable functional equivalents thereof.

Having described my invention, we claim:

1. A fitness apparatus for use upon a ground surface or building structure, commercial fitness apparatus, said fitness apparatus, comprising:
    a support assembly having a framework selectively mounted to one of the ground surface, the building structure, or fitness apparatus;
    a foot assembly rotatably coupled to said support assembly and configured such that said foot assembly is displaced above a ground surface;
    wherein said foot assembly includes a pair of retention members configured to selectively support the feet of a person in a toes-pointed downwardly position and above the ground surface;
    wherein:
        said foot assembly includes a rotational tube that defines an imaginary vertical axis;
        said foot assembly includes a framework coupled to said rotational tube;
        said rotational tube is rotatably coupled to said support assembly and selectively rotated about said vertical axis.

2. The fitness apparatus as in claim 1, wherein said support assembly includes:
    a base member having a conical shape configured to rest atop the ground surface; and
    an elongate pole extending upwardly from said base member, said base member having a linear and length adjustable configuration.

3. The fitness apparatus as in claim 2, wherein said pole is one of telescopic and threaded for length adjustment.

4. The fitness apparatus as in claim 1, wherein said support assembly includes:
    a base member having a plurality of legs selectively configured to rest atop the ground surface; and
    an elongate pole extending upwardly from said base member, said base member having a linear and length adjustable configuration.

5. The fitness apparatus as in claim 4, wherein said plurality of legs are length adjustable and are selectively movable between a stowed configuration and a deployed configuration.

6. The fitness apparatus as in claim 1, wherein:
    said foot assembly includes a rotational tube that defines an imaginary vertical axis;
    said foot assembly includes a framework coupled to said rotational tube;
    said rotational tube is rotatably coupled to said support assembly, said support assembly and said rotational tube defining a shared vertical axis such that said foot assembly is selectively rotated about said shared vertical axis.

7. The fitness apparatus as in claim 1, wherein said pair of retention members of said foot assembly includes:
    a pair of foot pads adjacent one another, each foot pad having a generally planar configuration for selectively supporting a foot of a person thereon; and
    a pair of foot straps coupled to opposing side edges of said pair of foot pads, respectively.

8. The fitness apparatus as in claim 1, wherein said pair of retention members of said foot assembly includes:
    a pair of foot pads adjacent one another, each foot pad having a generally planar configuration for selectively supporting a foot of a person thereon; and
    a pair of foot straps coupled to opposing side edges of said pair of foot pads, respectively.

9. The fitness apparatus as in claim 1, wherein said support assembly includes a hanging strap coupled at a first end to said foot assembly and having a fastener at an opposed second end releasably coupled to one of the building structure and commercial fitness apparatus.

10. The fitness apparatus as in claim 3, wherein said length adjustable pole includes a gas shock normally urged toward an extended configuration.

11. The fitness apparatus as in claim 1, wherein said support assembly includes:
    a base member having a generally planar square configuration constructed of tubing for resting atop the ground surface; and
    an elongate pole extending upwardly from said base member, said base member having a linear and length adjustable configuration.

12. A fitness apparatus for use upon a ground surface or building structure, commercial fitness apparatus, said fitness apparatus, comprising:
    a support assembly having a framework selectively mounted to one of the ground surface, the building structure, or fitness apparatus;
    a foot assembly rotatably coupled to said support assembly and configured such that said foot assembly is displaced above a ground surface;
    wherein said foot assembly includes a pair of retention members configured to selectively support the feet of a person in a toes-pointed downwardly position and above the ground surface;
    wherein:
        said foot assembly includes a rotational tube that defines an imaginary vertical axis;
        said foot assembly includes a framework coupled to said rotational tube;
        said rotational tube is rotatably coupled to one of the building structure and the fitness apparatus.

13. The fitness apparatus as in claim 12, wherein said foot assembly includes:

a pair of elongate spaced apart track members coupled to said framework;
   wherein said pair of retaining members are slidably coupled to said pair of track members, respectively, each retaining member being slidably movable along a respective track member.

14. The fitness apparatus as in claim 12, wherein said foot assembly includes:
   a pedaling accessory having an axle member operatively coupled to said framework, said axle member having opposed ends;
   wherein said pair of retaining members are coupled to said opposed ends of said axle member, respectively.

15. The fitness apparatus as in claim 12, wherein said pair of restraining members are coupled to said framework with a ball joint such that said restraining members are selectively adjustable when said ball joint is operated.

16. The fitness apparatus as in claim 12, wherein said foot assembly is rotationally coupled to said framework with swivel fasteners such that said foot assembly is selective rotatable about an imaginary axis perpendicular to said framework.

* * * * *